Jan. 8, 1952  C. V. ROPER  2,582,164
CLUTCH MECHANISM FOR CIRCULAR KNITTING MACHINES
Filed Dec. 19, 1950  2 SHEETS—SHEET 1
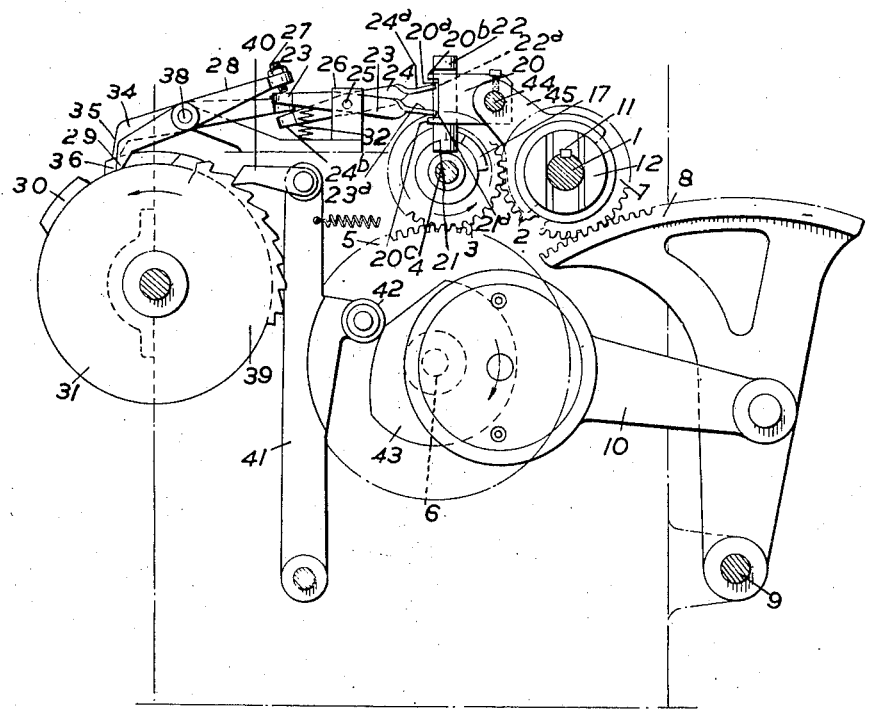
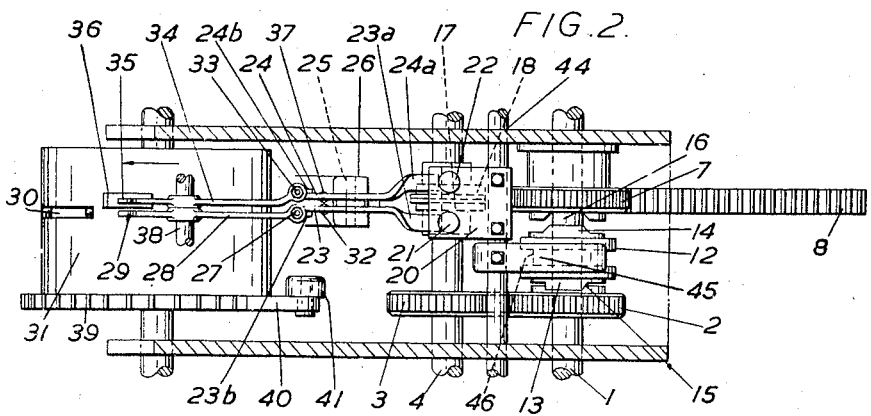
Inventor
Colin V. Roper
By Jan. 8, 1952 C. V. ROPER 2,582,164
CLUTCH MECHANISM FOR CIRCULAR KNITTING MACHINES
Filed Dec. 19, 1950 2 SHEETS—SHEET 2
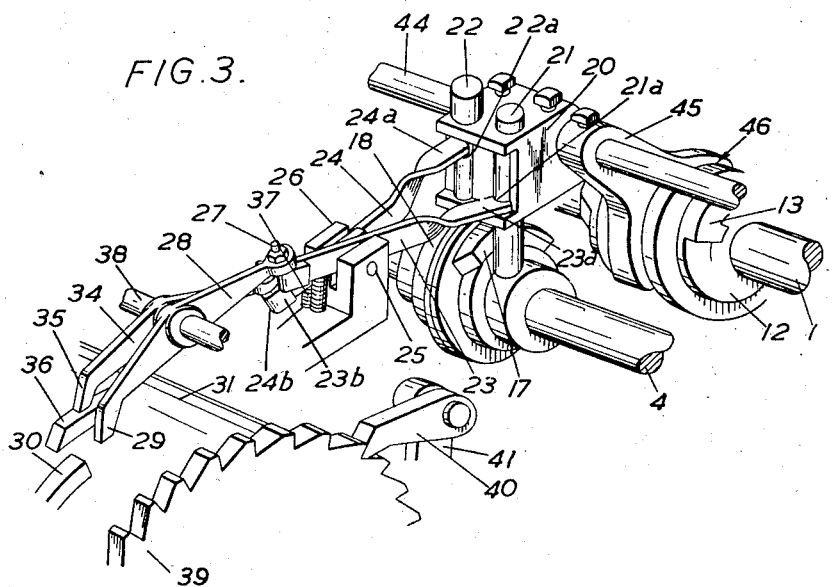
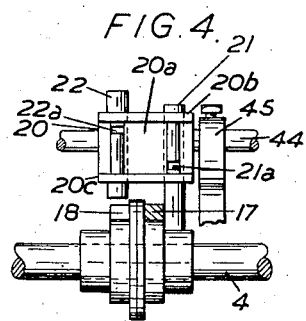
Inventor
Colin V. Roper
By Patented Jan. 8, 1952

2,582,164

UNITED STATES PATENT OFFICE 2,582,164

CLUTCH MECHANISM FOR CIRCULAR KNITTING MACHINES

Colin Vincent Roper, Leicester, England, assignor to G. Stibbe & Co. Limited, Leicester, England, a British company Application December 19, 1950, Serial No. 201,531
In Great Britain December 20, 1949

9 Claims. (Cl. 66—56)

This invention relates to circular seamless hose and half hose knitting machines adapted to operate both with rotary motion as well as with rotary-reciprocatory (oscillatory) motion in the production of heel and toe and like pouches.

A circular knitting machine of this type incorporates a clutch mechanism of the kind which is operable automatically from controlling means for the purpose of effecting, at required times, the necessary changes in the motion of the machine from rotary to oscillatory knitting, and vice versa.

A clutch mechanism of the kind concerned includes a sleeve-like clutch component which is slidably keyed to a drive shaft and has at least one clutch formation at each end thereof, the said component being slidable axially in either direction relatively to the drive shaft between one position in which the clutch formation or formations at one end of the clutch component is or are interengaged with a complementary formation or formations in or on a continuously rotating gear freely mounted on the shaft, and another position in which the clutch formation or formations at the opposite end of the clutch component is or are similarly interengaged with a complementary formation or formations in or on a gear (known as the quadrant pinion) which revolves to and fro upon the shaft. Thus, in this manner, one or the other of the two gears is always coupled to the said shaft to transmit the drive thereto.

The present invention has reference particularly to clutch mechanism of the kind described in the preceding paragraph, and has for its object to provide improved means for operating, and controlling the axial movements of, the clutch component.

According to this invention the clutch component is adapted to be moved axially along the drive shaft into engagement either with the continuously rotatable gear, or with the quadrant pinion, by the appropriate one of two cams mounted on a rotary shaft separate from the drive shaft, the said cams being arranged for action upon members which are selectively movable into and out of the paths of the respective cams, at the dictates of controlling means, and are coupled, through any suitable intermediate connections, with the clutch component.

The important distinguishing feature of the invention is that the cams, in contra-distinction to being attached directly to the clutch component, are secured upon a rotary cam shaft quite separate and distinct from the drive shaft along which the clutch component is slidable.

An advantage arising from the adoption of the improved clutch mechanism is that the timing of the axial movements of the clutch component from one position to the other, according to requirements, can be accurately determined by adjustment of the two cams angularly about the axis of the rotary cam shaft. For the sake of convenience in the following further description the cams will be referred to as "phasing" cams.

A specific constructional example will now be described with reference to the accompanying drawings, wherein, Figure 1 is a side view of so much of the driving arrangement of a circular seamless hose knitting machine as is necessary to illustrate the said clutch mechanism, Figure 2 is a plan view of the same, Figure 3 is a general perspective view of the clutch mechanism per se, and Figure 4 is a detail view of the plunger block and the plungers showing the manner in which the latter are movable, selectively, into and out of the paths of the respective phasing cams.

Like parts are designated by similar reference characters throughout the drawings.

Referring to Figures 1 and 2, it will be seen that the knitting machine incorporating the improved clutch mechanism includes a drive shaft 1 from which the needle cylinder or cylinders (not shown) is or are driven. Freely mounted on the drive shaft 1 is a continuously rotatable gear 2 arranged in mesh with a gear 3 which is fixed on a cam shaft 4 and in turn meshes with a gear 5 on the main shaft 6 of the machine (see Figure 1). Thus, when the said main shaft is driven, the cam shaft 4 will be continuously rotated and impart, through the medium of the gear 3, continuous rotation to the gear 2 free on the drive shaft 1. Also freely mounted upon the drive shaft 1 is a quadrant pinion 7 which is arranged in mesh with a quadrant 8. As depicted in Figure 1, this quadrant is fulcrumed at 9 on the machine framing, and is adapted to be continuously oscillated from the main shaft 6, through the medium of a pitman 10, so as to cause the quadrant pinion 7 to revolve to and fro upon the drive shaft 1. Slidably keyed at 11 to the shaft 1 is a clutch component 12 having a clutch formation 13 projecting from one end thereof and an oppositely projecting clutch formation 14 at the opposite end. By sliding the clutch component 12 to the right (as viewed in Figure 3), the clutch formation 13 is interengaged with a complementary recess 15 formed in a boss on the continuously rotating gear 2, as shown in Figure 2, with the result that the shaft 1 is continuously driven uni-directionally to impart rotary motion to the needle cylinder or cylinders of the machine. Sliding movement of the component 12 to the left, on the other hand, will cause the clutch formation 14 to be engaged in a recess 16 in a boss on the oscillating quadrant pinion 7 as a consequence of which the motion of the drive shaft 1 and hence also of the needle cylinder or cylinders will be changed from rotary to rotary-reciprocatory.

The rotary cam shaft 4 is separate from, and extends parallel to, the drive shaft 1. Mounted side by side upon the said cam shaft 4 are two phasing cams 17 and 18. Disposed above the phasing cams is a rectangular plunger block 20 drilled with two vertical holes in which are mounted two plungers 21 and 22. The front of the plunger block 20 is recessed at 20a in such a way as to provide two horizontal flanges 20b and 20c disposed one above the other. Portions of the plungers 21 and 22 extending vertically between these flanges are exposed at the front of the block 20 where the said plungers are recessed at 21a and 22a to receive operative spatulate ends 23a and 24a of spade levers 23 and 24 respectively. The two levers 23 and 24 are arranged side by side and centrally fulcrumed as indicated at 25 within a bracket 26. The tail end 23b of the spade lever 23 is bent double suchwise as to increase its thickness and thereby provide a surface of sufficient area to be acted upon by an adjustable contact screw 27 secured in one end of a two-armed cam lever 28. The opposite end of the lever 28 has a toe 29 adapted to be acted upon at pre-determined times by a cam such as 30 on the control drum 31 of the machine. A compression spring 32 is arranged beneath the tail end 23b of the spade lever 23 and interposed between the latter and the base of the bracket 26. Similarly, the tail end 24b of the spade lever 24 is bent to provide a surface to be acted upon by an adjustable contact screw 33 secured in one end of a cam lever 34 the opposite end of which has a toe 35 arranged to be acted upon at appropriate times by a further cam such as 36 on the control drum 31. A compression spring 37 is interposed between the underside of the tail end 24b of the lever 24 and the base of the bracket 26. The two cam levers 28 and 34 are arranged side by side and mounted for pivotal movement independently upon a common fulcrum shaft 38. As to the control drum 31 this is adapted to be rotated intermittently for which it is fitted at one end with a ratchet wheel 39 with which is arranged to co-operate a slow racking pawl 40. The pawl 40 is pivotally mounted upon a spring-controlled lever 41 which is furnished with a roller 42 (see Figure 1) acted upon by a cam 43 on the main shaft 6.

The plunger block 20 is rigidly secured by means of screws upon an axially shiftable rod 44 to which is also secured a clutch fork 45 engaged in a peripheral groove 46 machined in the clutch component 12. The construction and arrangement are accordingly such that whenever the toe of either of the cam levers 28 or 34 is acted upon by, and rises onto, the relevant cam on the control drum 31, the tail end of the corresponding spade lever is depressed against spring action. As a consequence, the operative spatulate end of the said spade lever is raised to lift the engaged plunger clear of the relevant phasing cam. Conversely, when the toe of a cam lever drops off a control cam on the drum the tail end of the corresponding spade lever is permitted to rise with the result that the plunger is projected downwardly under the spring action into the path of the relevant phasing cam. This cam as it revolves then acts upon the downwardly projected plunger and so shifts the plunger block 20 and the clutch fork 45 laterally to effect engagement of the clutch component 12 either with the continuously rotating gear 2, or the quadrant pinion 7, as the case may be.

For instance, when it is necessary to change over from rotary to oscillatory knitting to make a heel or toe pouch, the control drum 31 is racked round in the direction of the arrow in Figures 1 and 2, so that the toe 35 of the cam lever 34 drops off a cam such as 36 and the toe 29 of the other cam lever 28 rises onto another cam such as 30. As a consequence, the plunger 22 is projected downwardly into its operative position in the path of the phase cam 18, whilst the plunger 21 is automatically raised to its inoperative position clear of the phase cam 17. The ensuing lateral movement of the plunger block 20 to the left as viewed from the front of the machine effects axial movement of the clutch component 12 from the position in which it engages the continuously rotating gear 2 to the position in which it engages the quadrant pinion 7.

The clutch component 12 is timed to interengage with either the rotating gear 2 or the quadrant pinion 7 at precisely the required moment. As previously mentioned this is achieved by so angularly adjusting the phasing cams 17 and 18 that they will strike the respective plungers 21 and 22 at the required times.

What I claim is:

1. In a circular knitting machine, in combination, a main shaft, a cylinder drive shaft, a gear freely mounted on the said cylinder drive shaft and continuously rotatable from the said main shaft, the said gear having clutch formations, a pinion also having clutch formations and freely mounted on the cylinder drive shaft, a toothed quadrant arranged in mesh with the said pinion and adapted to be continuously oscillated from the main shaft, a clutch part which is feathered upon the cylinder drive shaft and has clutch formations at opposite ends thereof, the said part being slidable axially in either direction relatively to the drive shaft between one position in which the clutch formations at the appropriate end of the clutch part operatively engage the clutch formations of the continuously rotating gear and another position in which the clutch formations at the opposite end of the clutch part operatively engage the clutch formations of the oscillating quadrant pinion, a rotary cam shaft separate from the cylinder drive shaft and driven from the main shaft, two cams on the said cam shaft for effecting required axial movements of the clutch part from one position to the other, two members which are selectively movable into and out of the path of the respective cams, means for controlling the movements of the said members, and means connecting these members with the aforesaid clutch part.

2. A combination according to claim 1, wherein the continuously rotatable gear on the cylinder drive shaft is driven from the rotary cam shaft.

3. A combination according to claim 1, wherein the two cams are adjustable angularly about the axis of the rotary cam shaft for the purpose of enabling the axial movements of the clutch part from one position to the other to be accurately timed.

4. In a circular knitting machine, in combination, a main shaft, a cylinder drive shaft, a gear freely mounted on the said cylinder drive shaft and continuously rotatable from the said main shaft, the said gear having clutch formations, a pinion also having clutch formations and freely mounted on the cylinder drive shaft, toothed quadrant arranged in mesh with the said pinion and adapted to be continuously oscillated from the main shaft, a clutch part which is feathered upon the cylinder drive shaft and has clutch formations at opposite ends thereof, the said part being slidable axially in either direction relatively to the drive shaft between one position in which the clutch formations at the appropriate end of the clutch part operatively engage the clutch formations of the continuously rotating gear and another position in which the clutch formations at the opposite end of the clutch part operatively engage the clutch formations of the oscillating quadrant pinion, a rotary cam shaft separate from the cylinder drive shaft and driven from the main shaft, two cams on the said cam shaft for effecting required axial movements of the clutch part from one position to the other, two plungers which are selectively movable into and out of the paths of the respective cams, a block in which the said plungers are mounted, levers arranged to engage the plungers, means for controlling the actuation of the said levers and hence also the movements of the plungers so that when one of the plungers is projected into the path of the corresponding cam the other plunger is automatically withdrawn clear of the other cam, and vice versa, and means connecting the aforesaid plunger block with the clutch part.

5. In a circular knitting machine, in combination, a main shaft, a cylinder drive shaft, a gear freely mounted on the said cylinder drive shaft and continuously rotatable from the said main shaft, the said gear having clutch formations, a pinion also having clutch formations and freely mounted on the cylinder drive shaft, a toothed quadrant arranged in mesh with the said pinion and adapted to be continuously oscillated from the main shaft, a clutch part which is feathered upon the cylinder drive shaft and has clutch formations at opposite ends thereof, the said part being slidable axially in either direction relatively to the drive shaft between one position in which the clutch formations at the appropriate end of the clutch part operatively engage the clutch formations of the continuously rotating gear and another position in which the clutch formations at the opposite end of the clutch part operatively engage the clutch formations of the oscillating quadrant pinion, a rotary cam shaft separate from the cylinder drive shaft and driven from the main shaft, two cams on the said cam shaft for effecting required axial movements of the clutch part from one position to the other, two plungers which are selectively movable into and out of the paths of the respective cams, a block in which the said plungers are mounted, levers arranged to engage the plungers, means for controlling the actuation of the said levers and hence also the movements of the plungers so that when one of the plungers is projected into the path of the corresponding cam the other plunger is automatically withdrawn clear of the other cam, and vice versa, an axially shiftable rod upon which the plunger block is secured, and, also secured upon the said rod, a fork in permanent engagement with the clutch part.

6. In a circular knitting machine, in combination, a main shaft, a cylinder drive shaft, a gear freely mounted on the said cylinder drive shaft and continuously rotatable from the said main shaft, the said gear having clutch formations, a pinion also having clutch formations and freely mounted on the cylinder drive shaft, toothed quadrant arranged in mesh with the said pinion and adapted to be continuously oscillated from the main shaft, a clutch part which is feathered upon the cylinder drive shaft and has clutch formations at opposite ends thereof, the said part being slidable axially in either direction relatively to the drive shaft between one position in which the clutch formations at the appropriate end of the clutch part operatively engage the clutch formations of the continuously rotating gear and another position in which the clutch formations at the opposite end of the clutch part operatively engage the clutch formations of the oscillating quadrant pinion, a rotary cam shaft separate from the cylinder drive shaft and driven from the main shaft, two cams on the said cam shaft for effecting required axial movements of the clutch part from one position to the other, two plungers which are selectively movable into and out of the paths of the respective cams, each of said plungers having a recess formed therein, a block in which the plungers are mounted to slide, actuating levers the operative ends of which are engaged in the recesses in the plungers, cam levers for action upon the opposite ends of the said plunger-actuating levers, an intermittently rotatable control drum having cams thereon for operating the cam levers, whereby the movements of the plungers are so controlled that when one of the plungers is projected into the path of the corresponding cam the other plunger is automatically withdrawn clear of the other cam, and vice versa, and means for connecting the aforesaid plunger block with the clutch part.

7. A combination according to claim 6, wherein the plunger-actuating levers are subject to the influence of springs whereby the tail ends of the said levers are caused to press yieldingly upon the cam levers suchwise as to hold the appropriate ends of the latter in contact with the control drum.

8. In a circular knitting machine, in combination, a main shaft, a cylinder drive shaft, a gear freely mounted on the said cylinder drive shaft and continuously rotatable from the said main shaft, the said gear having clutch formations, a pinion also having clutch formations and freely mounted on the cylinder drive shaft, a toothed quadrant arranged in mesh with the said pinion and adapted to be continuously oscillated from the main shaft, a clutch part which is feathered upon the cylinder drive shaft and has clutch formations at opposite ends thereof, the said part being slidable axially in either direction relatively to the drive shaft between one position in which the clutch formations at the appropriate end of the clutch part operatively engage the clutch formations of the continuously rotating gear and another position in which the clutch formations at the opposite end of the clutch part operatively engage the clutch formations of the oscillating quadrant pinion, a rotary cam shaft separate from the cylinder drive shaft and driven from the main shaft, two cams on the said cam shaft for effecting required axial movements of the clutch part from one position to the other, two plungers which are selectively movable into and out of the paths of the respective cams, each of said plungers having a recess formed therein, a block in which the plungers are mounted to slide, actuating levers the operative ends of which are engaged in the recesses in the plungers, cam levers for action upon the opposite ends of the said plunger-actuating levers, an intermittently rotatable control drum having cams thereon for operating the cam levers, whereby the movements of the plungers are so controlled that when one of the plungers is projected into the path of the corresponding cam the other plunger is automatically withdrawn clear of the other cam, and vice versa, an axially shiftable rod upon which the plunger block is secured, and, also secured upon the said rod, a fork in permanent engagement with the clutch part.

9. A combination according to claim 8, wherein each cam lever at its end remote from the control drum is fitted with an adjustable screw for contact with the tail end of the corresponding plunger-actuating lever.

COLIN VINCENT ROPER.

No references cited.